W. F. BRADY.
MOLDING MACHINE.
APPLICATION FILED JUNE 11, 1919.

1,351,020.

Patented Aug. 31, 1920.
2 SHEETS—SHEET 1.

Inventor,
William F. Brady,
By Samuel W. Balch
Attorney.

W. F. BRADY.
MOLDING MACHINE.
APPLICATION FILED JUNE 11, 1919.

1,351,020.

Patented Aug. 31, 1920.
2 SHEETS—SHEET 2.

Inventor,
William F. Brady,
By Samuel W. Balch
Attorney.

UNITED STATES PATENT OFFICE.

WILLIAM F. BRADY, OF NEWARK, NEW JERSEY, ASSIGNOR TO CROCKER-WHEELER COMPANY, OF AMPERE, NEW JERSEY, A CORPORATION OF NEW JERSEY.

MOLDING-MACHINE.

1,351,020.  Specification of Letters Patent.  Patented Aug. 31, 1920.

Application filed June 11, 1919. Serial No. 303,390.

*To all whom it may concern:*

Be it known that I, WILLIAM F. BRADY, a citizen of the United States of America, and a resident of Newark, in the county of Essex and State of New Jersey, have invented certain new and useful Improvements in Molding-Machines, of which the following is a specification.

The object of this invention is to provide a molding machine with means for ramming both parts of the flask, and with means for lifting the cope, and for turning the cope in use of which the power mechanism for ramming is also utilized whereby a molder can without assistance put up molds which are in whole or in their parts too heavy for him to lift without assistance.

In the accompanying two sheets of drawings which form a part of this application, Figure 1 is a front view of a molding machine which embodies this invention.

Figure 1:
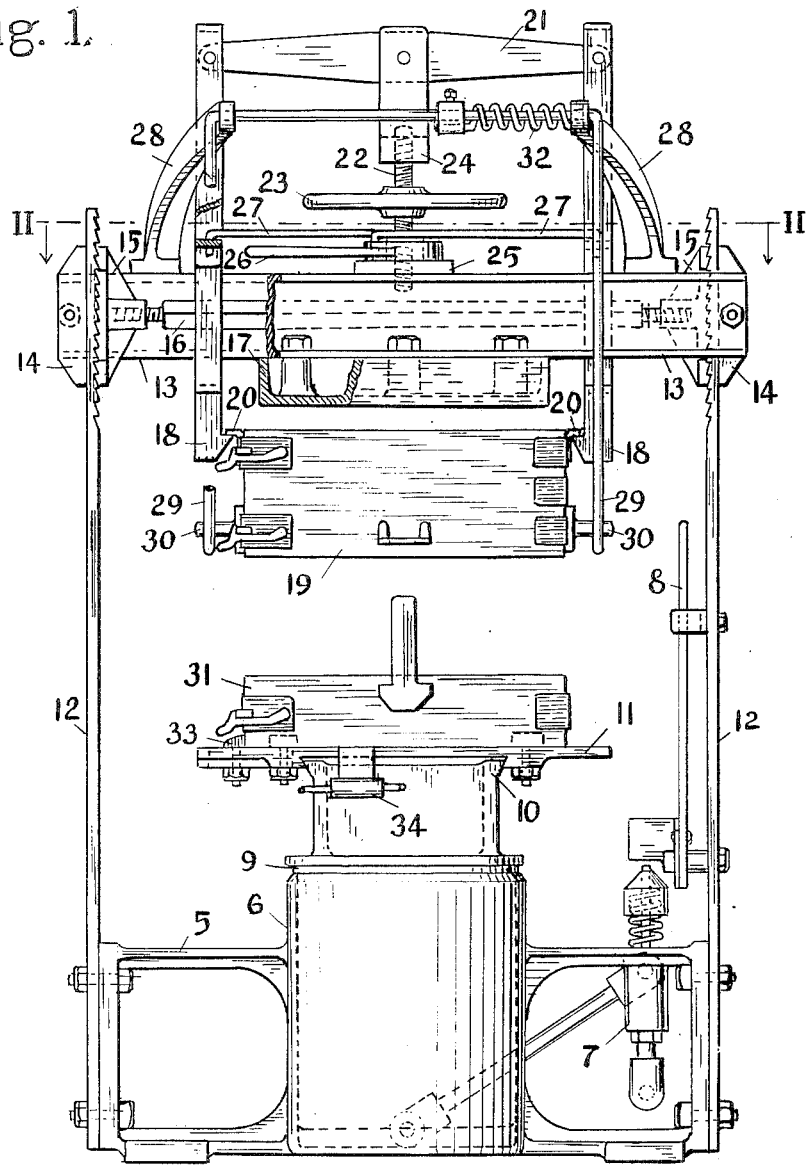
Figure 2:
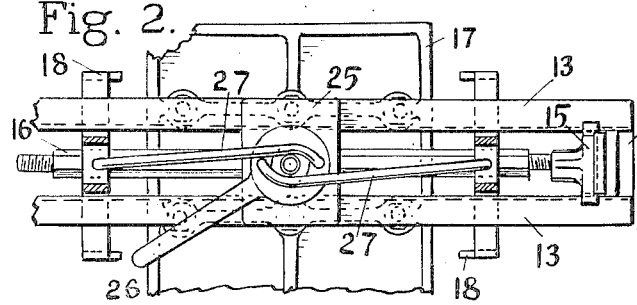
Fig. 2 is a horizontal section through the crosshead on the line II—II of Fig. 1, omitting the forwardly projecting arms.
Figure 3:
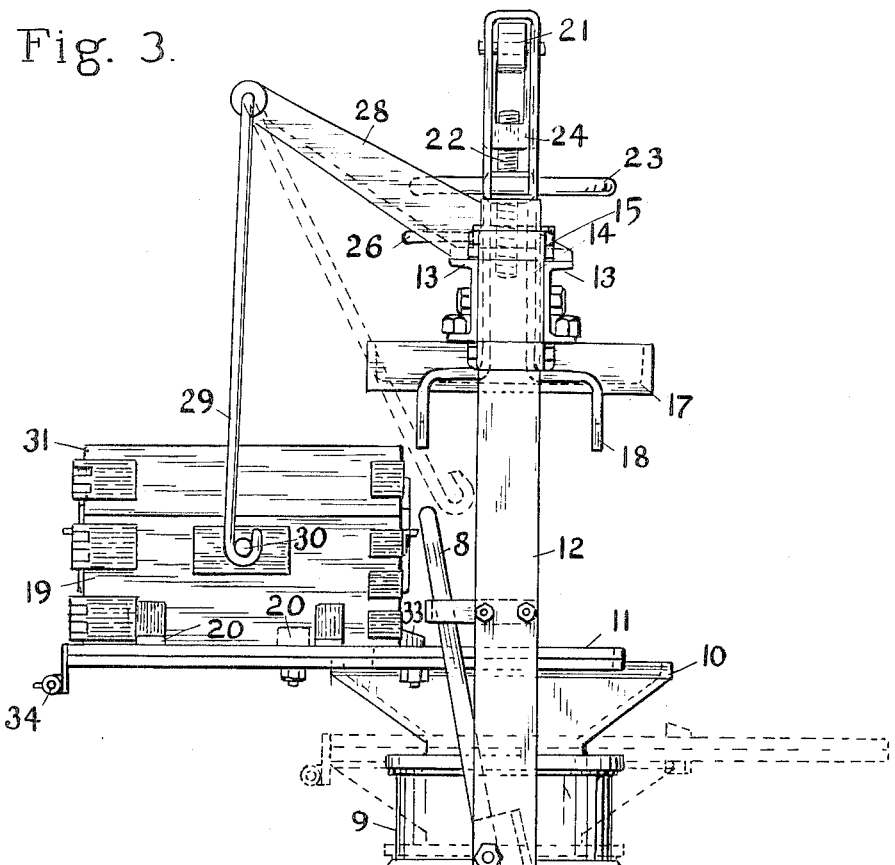
Fig. 3 is a side elevation of the machine showing a flask brought into engagement with the trunnion hooks.
Figure 4:
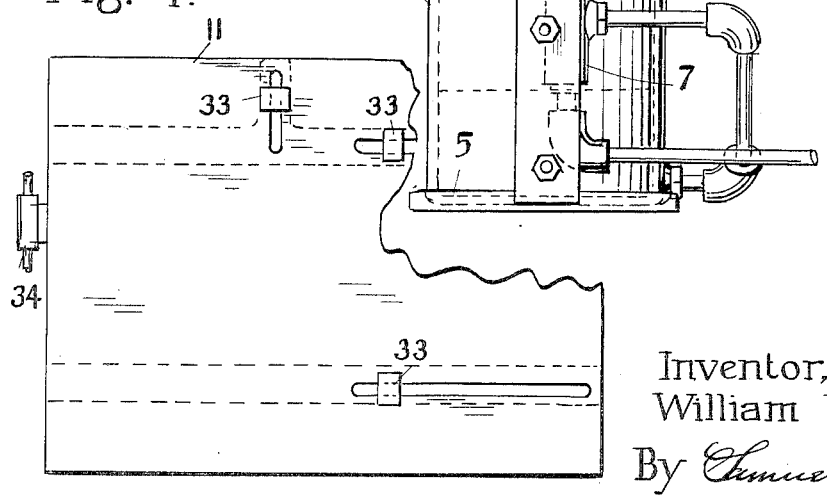
Fig. 4 is a plan of the table.

The molding machine comprises a base framework 5 with which is cast a vertical cylinder 6 and a valve 7 through which compressed air is admitted to the cylinder. A lever 8 controls the valve. A piston 9 in the cylinder carries a horizontal slide 10 on which is a horizontal flask-supporting table 11. Uprights 12, 12 are bolted to the framework and support near their upper ends a crosshead consisting of two channel bars 13, 13 separated by blocks 14, 14 at their ends to which they are bolted. The crosshead is firmly secured to the uprights by jaws 15, 15 which are clamped against serrated sides of the uprights by a bar 16, the ends of which have right and left hand threads engaging the jaws. The bar is hexagonal so that it can be turned with a wrench when it is desired to operate the jaws for the purpose of altering the height of the crosshead above the table to adapt the machine to a flask of a different height. A rammer 17 is bolted to the under side of the crosshead. Forked cope-drawing hooks 18, 18 hang between the channels of the crosshead in a position to engage the cope 19 through two lugs 20, 20 on each side thereof when it is under the rammer. The hooks are hung from an equalizer 21 which is supported from the crosshead through a right and left hand threaded shaft 22 which may be turned by a hand-wheel 23. The upper end of the shaft engages threads in a fulcrum piece 24 which supports the equalizer and the lower end engages threads in a strap 25 which is supported on the crosshead. By turning the hand-wheel the hooks are vertically adjusted relative to the rammer. The strap is provided with a hub through which the lower threaded end of the shaft passes. The outside of this hub serves as a fulcrum for a hand lever 26, and two connecting rods 27, 27 lead from points on the collar of the lever surrounding the hub to the cope-drawing hooks so that through this lever the cope-drawing hooks are concurrently engaged or disengaged.

The crosshead also carries forwardly projecting arms 28, 28 from which depend a pair of trunnion-hooks 29, 29 for engaging trunnions 30, 30 on the cope by which, by itself, or with the other part 31 of the flask attached, it may be turned over. The air power is used in lifting the cope so as to be engaged by the cope-drawing hooks, and then on releasing the air the table falls carrying with it the drag and pattern and thereby effecting the drawing of the cope from the pattern. The air power is also used in lifting the cope when it is to be engaged with the trunnion-hooks when it is to be turned over. A spring 32 folds the trunnion hooks back out of the way of the molder when they are not being used.

The table is provided with adjustable stops 33, 33 against which the flask is pushed in order to properly center it under the rammer. The table carries a vibrator 34. The molder draws the table forward when putting up the mold and drawing the pattern, and the table is pushed back under the head for pressing. When drawn forward it can also be elevated by the power mechanism to any desired height suited to the convenience of the molder.

What I claim, is—

1. In a sand molding machine, the combination of a horizontal flask-supporting table, a crosshead, a rammer attached to the crosshead, drawing hooks carried by the crosshead for engaging the cope of the flask when it is under the rammer, and means for effecting relative vertical movement of the crosshead and table, substantially as described.

2. In a molding machine, the combination of a horizontal flask - supporting table, a crosshead, a rammer attached to the crosshead, drawing hooks for engaging the cope of the flask when it is under the rammer, an equalizer carried by the crosshead for carrying the hooks, and means for effecting relative vertical movement of the crosshead and table, substantially as described.

3. In a molding machine, the combination of a horizontal flask - supporting table, a crosshead, a rammer attached to the crosshead, drawing hooks carried by the crosshead for engaging the cope of the flask when it is under the rammer, means for vertically adjusting the hooks relatively to the rammer, and means for effecting relative vertical movement of the crosshead and table, substantially as described.

4. In a molding machine, the combination of a horizontal flask - supporting table, a crosshead, a rammer attached to the crosshead, drawing hooks carried by the crosshead for engaging the cope of the flask when it is under the rammer, means for concurrently operating the hooks, and means for effecting relative vertical novement of the crosshead and table, substantially as described.

5. In a molding machine, the combination of a horizontal flask - supporting table, a crosshead, a rammer attached to the crosshead, drawing hooks for engaging the cope of the flask when it is under the rammer, an equalizer carried by the crosshead for carrying the hooks, means for vertically adjusting the hooks relatively to the rammer, and means for effecting relative vertical movement of the crosshead and table, substantially as described.

6. In a molding machine, the combination of a horizontal flask - supporting table, a crosshead, a rammer attached to the crosshead, forwardly projecting arms carried by the crosshead, a pair of trunnion hooks pivoted to the arms and adapted to engage trunnions on the cope of the flask, substantially as described.

7. In a molding machine, the combination of a fixed crosshead, a rammer attached to the crosshead, a horizontal slide, a flask supporting table carried by the slide, and means for effecting vertical movement of the slide and table in any position of the table on the slide, substantially as described.

WILLIAM F. BRADY.